(12) United States Patent
Kim

(10) Patent No.: US 7,027,196 B2
(45) Date of Patent: Apr. 11, 2006

(54) TILT SERVO APPARATUS FOR USE IN ROM SYSTEM

(75) Inventor: Kun Yul Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 121 days.

(21) Appl. No.: 10/847,312

(22) Filed: May 18, 2004

(65) Prior Publication Data

US 2005/0128541 A1    Jun. 16, 2005

(30) Foreign Application Priority Data

Dec. 15, 2003    (KR) ............... 10-2003-0091068

(51) Int. Cl.
*G02B 5/32* (2006.01)

(52) U.S. Cl. ..................... 359/15; 369/44.32
(58) Field of Classification Search ............ 359/1, 359/15; 369/43, 44.11–44.42, 112.01, 112.02, 369/112.03, 112.1
See application file for complete search history.

(56) References Cited

U.S. PATENT DOCUMENTS

| | | | | |
|---|---|---|---|---|
| 4,478,480 A | * | 10/1984 | Doggett | ............ 359/18 |
| 6,661,769 B1 | * | 12/2003 | Kadowaki et al. | ....... 369/275.4 |
| 2003/0198158 A1 | | 10/2003 | Roh et al. | |

FOREIGN PATENT DOCUMENTS

EP    1 282 119    2/2003

* cited by examiner

*Primary Examiner*—Mark A. Robinson
*Assistant Examiner*—Alessandro Amari
(74) *Attorney, Agent, or Firm*—Bacon & thomas, PLLC

(57) ABSTRACT

A tilt servo apparatus for use in a ROM system includes means for generating a reconstructing beam to be projected onto a digital storage medium to generate a reflected beam; a holographic plate for storing a first and a second hologram and diffracting the reflected beam with the first and the second hologram to generate a first and a second holographic diffracted beam, respectively; a first and a second detector for generating a first and a second detected signal by detecting the first and the second holographic diffracted beam, respectively; means for generating a tilt servo signal based on the first and the second detected signal; and means for compensating a tilt error of the digital storage medium by using the tilt servo signal.

16 Claims, 2 Drawing Sheets

TILT SERVO APPARATUS FOR USE IN ROM SYSTEM

FIELD OF THE INVENTION

The present invention relates to a tilt servo apparatus; and, more particularly, to a tilt servo apparatus for use in a ROM system for compensating a tilt phenomenon due to a wobbling of a digital storage medium by using a reflected beam obtained by a reflection from the digital storage medium and an angular selectivity of a hologram stored in a holographic plate.

BACKGROUND OF THE INVENTION

As well known in the art, a demand for a holographic storage medium capable of storing plenty of data has been increasing continuously. Therefore, recently, various types of holographic storage media have been developed to implement high storage capacity.

In a recording mode of a holographic ROM system as a typical system using a holographic storage medium, a modulated signal beam which has been modulated by digital data to be stored in the holographic storage medium and a reference beam are interfered to generate a holographic interference pattern therebetween, and such interference pattern is stored in the holographic storage medium (e.g., shaped as a disk) formed of, e.g., an optical refractive crystal. The optical refractive crystal is a material reacting differently according to an amplitude and a phase of the holographic interference pattern. In a reconstructing mode of the holographic ROM system, a reconstructing beam which is substantially equivalent to a complex conjugate of the reference beam used in the recording mode is illuminated on the holographic interference pattern stored in the holographic storage medium, and digital data are reconstructed by picking up a reconstructed beam formed by a diffraction of the reconstructing beam by the holographic interference pattern recorded in the holographic storage medium.

Then, in order to allow the digital data from the reconstructed beam generated by the holographic interference pattern to be reliable, an incidence angle of the reconstructing beam must be identical to that of the reference beam or different from that of the reference beam by 180 degrees (if the reconstructing beam is the complex conjugate of the reference beam). In particular, the incidence angle of the reconstructing beam on the holographic storage medium must be controlled highly precisely since the holographic storage medium has an angular selectivity.

However, the reconstructed beam cannot be precisely picked up from the holographic storage medium since the incidence angle of the reconstructing beam on the holographic storage medium is fluctuated by a tilt phenomenon due to a wobbling of the holographic storage medium as the disk-shaped holographic storage medium is rotated at a high speed.

Further, since any disk rotated at a high speed is subject to the tilt phenomenon due to the wobbling of the disk, in an optical ROM system using an optical storage medium such as a digital video disk (DVD) in which digital data are read by reflecting the reconstructing beam, the reflected beam obtained from the reconstructing beam cannot be precisely picked up by the tilt phenomenon due to the wobbling of the optical storage medium.

SUMMARY OF THE INVENTION

It is, therefore, an object of the present invention to provide to a tilt servo apparatus in a ROM system for compensating a tilt phenomenon due to a wobbling of a digital storage medium including a holographic and an optical storage medium by using a reflected beam obtained by a reflection from a digital storage medium and an angular selectivity of a hologram stored in a holographic plate.

In accordance with one aspect of the present invention, there is provided a tilt servo apparatus, comprising:

means for generating a reconstructing beam and projecting the reconstructing beam onto a digital storage medium to generate a reflected beam reflected by the digital storage medium tilted within a tilt range;

a holographic plate for storing a first and a second hologram, wherein the first hologram is an interference pattern between a first tilt reference beam projected at a first tilt reference angle and a first tilt signal beam projected at a first tilt signal angle and the second hologram is an interference pattern between a second tilt reference beam projected at a second tilt reference angle and a second tilt signal beam projected at a second tilt signal angle, and diffracting the reflected beam with the first and the second hologram to generate a first and a second holographic diffracted beam, respectively;

a first and a second detector for generating a first and a second detected signal by detecting the first and the second holographic diffracted beam, respectively;

means for generating a tilt servo signal based on the first and the second detected signal; and means for compensating a tilt error of the digital storage medium by using the tilt servo signal.

In accordance with another aspect of the invention, there is provided a holographic plate for use in a tilt servo apparatus in which a reconstructing beam is reflected by a digital storage medium tilted by a tilt error to generate a reflected beam of the reconstructing beam, wherein the holographic plate stores a first and a second hologram and diffracts the reflected beam with the first and the second hologram to generate a first and a second holographic diffracted beam, respectively, which are used to form a tilt servo signal for compensating the tilt error of the digital storage medium, wherein the first hologram is a holographic interference pattern between a first tile reference beam projected at a first tilt reference angle and a first tilt signal beam projected at a first tilt signal angle and the second hologram is a holographic interference pattern between a second tile reference beam projected at a second tilt reference angle and a second tilt signal beam projected at a second tilt signal angle.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
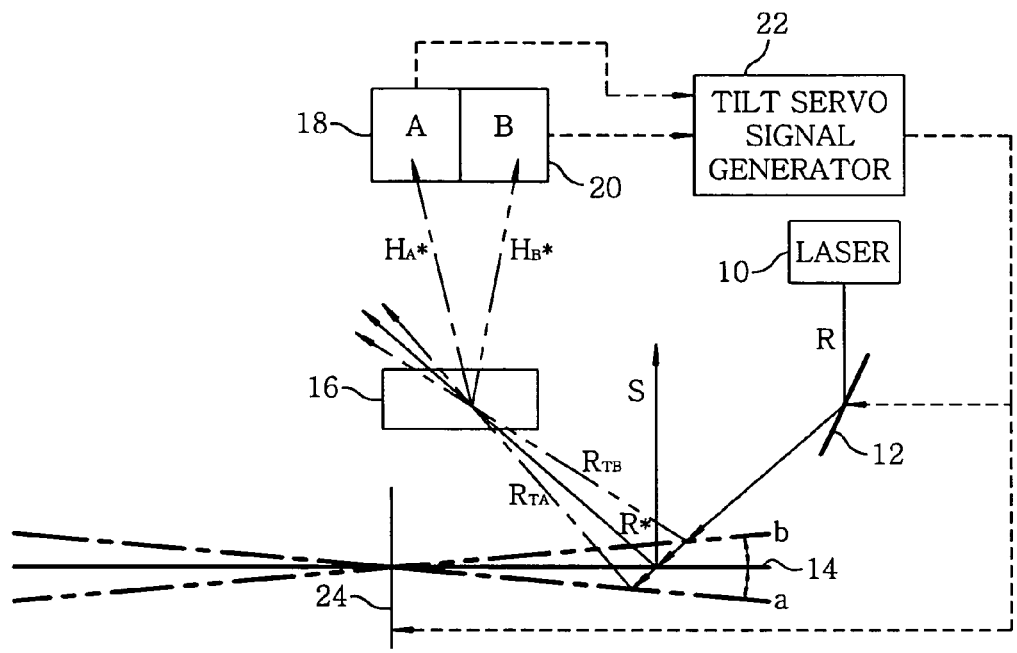
FIG. 1 is a block diagram of a tilt servo apparatus for use in a ROM system in accordance with the present invention.

FIG. 1 shows a tilt servo apparatus in accordance with a preferred embodiment of the present invention. The tilt servo apparatus includes a light source 10, e.g., a laser, a mirror 12, a digital storage medium 14, a holographic plate 16, a first and a second detector 18, 20, and a tilt servo signal generator 22.

It is assumed that the digital storage medium 14 in accordance with the present invention has a shape of a disk and a reconstructing beam is illuminated on the digital storage medium 14 during a rotation of the digital storage medium 14 around a center axis thereof to pick up information recorded in the digital storage medium 14. The digital storage medium 14 includes a holographic storage medium and an optical storage medium. The holographic storage medium is a storage medium which stores a holographic interference pattern formed by an interference between a modulated signal beam having information therein and a reference beam having a same wavelength and a same polarization as the modulated signal beam. When the reconstructing beam corresponding to the reference beam is illuminated on the holographic interference pattern, the reconstructing beam is diffracted by the holographic interference pattern depending on a holographic principle to generate a reconstructed beam corresponding to the signal beam. In the meantime, the optical storage medium is a storage medium for recording and detecting an optical signal by using reflection characteristics of a beam. The optical storage medium includes a read-only disk (e.g., a compact disk read-only memory (CD-ROM) and a digital video disk (ROM)), a magneto-optical disk, or a phase change optical disk.

The reconstructing beam R for reconstructing data is projected onto the digital storage medium 14. The light source 10 generates the reconstructing beam R, and the mirror 12 projects the reconstructing beam R onto the digital storage medium 14 at a predetermined angle. For example, when the digital storage medium 14 is the holographic storage medium, the reconstructing beam R must be a complex conjugate of the reference beam in order that the reconstructing beam R is diffracted by the holographic interference pattern stored in the holographic storage medium to generate the reconstructed beam S. On the other hand, when the digital storage medium 14 is the optical storage medium, the reconstructing beam R is projected onto the optical storage medium at a predetermined incidence angle, so that a reflected beam R* formed from the reconstructing beam R reflected by an optical recording layer may be used to extract an the optical signal recorded in the optical storage medium.

Figure 2:
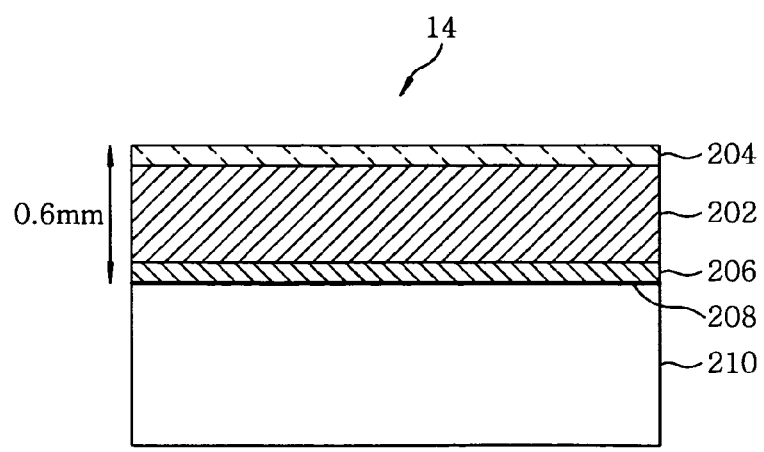
FIG. 2 shows a structure of a holographic storage medium used in the tilt servo apparatus in accordance with the present invention.

Unlike a conventional holographic storage medium which has no reflective layer, a reflective layer for reflecting the reconstructing beam R must be formed in the holographic storage medium in order that the holographic storage medium reflects the reconstructing beam R to generate the reflected beam R* in accordance with the present invention. FIG. 2 shows a structure of the holographic storage medium 14 in accordance with the present invention. The holographic storage medium 14 includes a holographic recording layer 202 for storing a holographic interference pattern between the modulated signal beam modulated by a holographic signal and the reference beam therein, an upper and a lower protective layer 204, 206 formed on an upper and a lower surface of the holographic recording layer 202, respectively, a reflective layer 208 formed on a lower surface of the lower protective layer 206 for generating the reflected beam R* by reflecting the reconstructing beam R, and a substrate layer 210 formed on a lower surface of the reflective layer 208. Traditionally, in case of the optical storage medium such as DVD, an entire thickness thereof is 1.2 mm and the reflective layer is located 0.55 to 0.65 mm (corresponding to about a half of the entire thickness of the optical storage medium) away from a lower surface thereof. Accordingly, it is preferable that the reflective layer of the holographic storage medium is located 0.55 to 0.65 mm (corresponding to about a half of the entire thickness (1.2 mm) of the holographic storage medium) away from a lower surface thereof as located in the optical storage medium such as DVD in order to maintain a compatibility between the optical storage medium and the holographic storage medium.

While the digital storage medium 14 with the shape of a disk is rotated around the center axis thereof at a high speed, the digital storage medium 14 is tilted as shown with a dotted dash line a and a double dotted dash line b in FIG. 1 due to the wobbling of the digital storage medium 14. Thus, a reflection angle of the reflected beam R* formed from the reconstructing beam R reflected by the digital storage medium 14 exists within a specified range as shown in FIG. 1.

Figure 3:
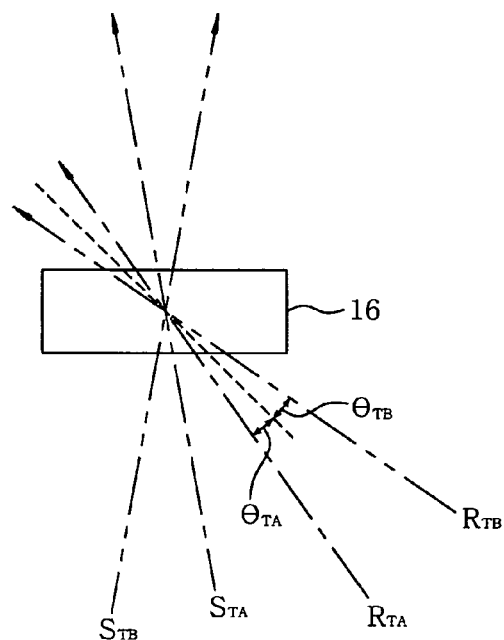
FIG. 3 is an explanatory diagram of a principle for storing two holograms in a holographic plate in accordance with the present invention.

FIG. 3 is an explanatory diagram of a principle for storing two holograms in the holographic plate 16 for implementing the tilt servo apparatus in accordance with the present invention. The holographic plate 16 is formed of a material, in which a hologram can be recorded, such as a photopolymer and a photorefractive crystal. Specifically, a first tilt reference beam $R_{TA}$ and a first tilt signal beam $S_{TA}$ are projected onto the holographic plate 16 at a first tilt reference angle $\theta_{TA}$ and a first tilt signal angle, respectively, so that a holographic interference between the first tilt reference beam $R_{TA}$ and the first tilt signal beam $S_{TA}$ may be stored as a first hologram in the holographic plate 16. Further, a second tilt reference beam $R_{TB}$ and a second tilt signal beam $S_{TB}$ are projected onto the holographic plate 16 at a second tilt reference angle $\theta_{TB}$ and a second tilt signal angle, respectively, so that another holographic interference between the second tilt reference beam $R_{TB}$ and the second tilt signal beam $S_{TB}$ may be stored as a second hologram in the holographic plate 16. Therefore, when a reference beam corresponding to the first tilt reference beam $R_{TA}$ is projected onto the holographic plate 16 at the first tilt reference angle $\theta_{TA}$, the reference beam is diffracted to reconstruct a signal beam corresponding to the first tilt signal beam $S_{TA}$ at the first tilt signal angle. Further, when a reference beam corresponding to the second tilt reference beam $R_{TB}$ is projected onto the holographic plate 16 at the second tilt reference angle $\theta_{TB}$, the reference beam is diffracted to reconstruct a signal beam corresponding to the second tilt signal beam $S_{TB}$ at the second tilt signal angle. It is preferable that all of the first tilt reference beam $R_{TA}$, the second tilt reference beam $R_{TB}$, the first tilt signal beam $S_{TA}$ and the second tilt signal beam $S_{TB}$ have a same wavelength as the reconstructing beam R and the reflected beam R*. Referring back to FIG. 1, the first and the second tilt reference angle $\theta_{TA}$ and $\theta_{TB}$ are determined by a range of a reflection angle θ of the reflected beam R* formed by a reflection of the reconstructing beam R from the digital storage medium 14 tilted within a tilt range. For example, when the digital storage medium 14 is tilted as the dotted dash line a so that the reflection angle θ of the reflected beam R* is equal to the first tilt reference angle $\theta_{TA}$, the reflected beam R* is diffracted by the first hologram to generate only a first holographic diffracted beam $H_A{}^*$ corresponding to the first tilt signal beam $S_{TA}$ generating no second holographic diffracted beam $H_B{}^*$ corresponding to the second tilt signal beam $S_{TB}$. On the contrary, when the digital storage medium 14 is tilted as the double dotted dash line b so that the reflection angle θ of the reflected beam R* is equal to the second tilt reference angle $\theta_{TB}$, the reflected beam R* is diffracted by the second hologram to generate only the second holographic diffracted beam $H_B{}^*$ corresponding to the second tilt signal beam $S_{TB}$ generating no first holographic diffracted beam $H_A{}^*$ corresponding to the first tilt signal beam $S_{TA}$. Consequently, it is preferable that the first and the second tilt reference angle $\theta_{TA}$ and $\theta_{TB}$ of the holographic plate 16 are determined according to an angular selectivity of the first and the second hologram stored in the holographic plate 16.

Figure 4:
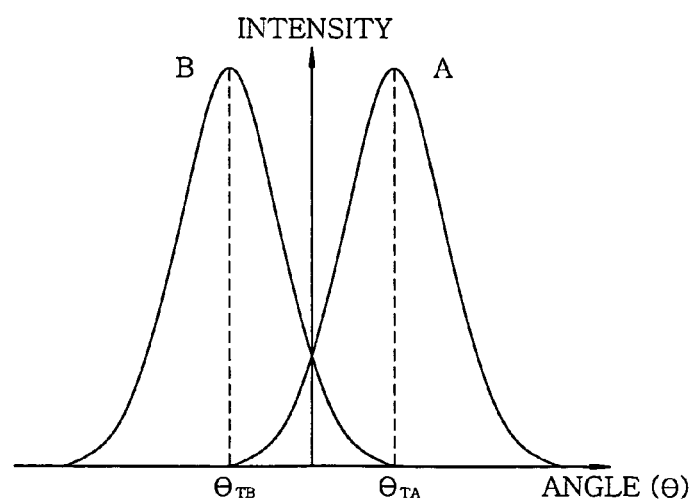
FIG. 4 illustrates an angular selectivity of two holograms in the holographic plate with respect to a reflection angle θ of a reflected beam R* in accordance with the present invention.

FIG. 4 illustrates the angular selectivity of the first and the second hologram stored in the holographic plate 16 with respect to the reflection angle θ of the reflected beam R* in accordance with the present invention. If the reflection angle θ of the reflected beam R* generated by the digital storage medium 14 is equal to the first tilt reference angle $\theta_{TA}$, the first holographic diffracted beam $H_A{}^*$ has a maximum intensity. Further, as the reflection angle θ becomes greater or smaller than the first tilt reference angle $\theta_{TA}$, the intensity of the first holographic diffracted beam $H_A{}^*$ decreases rapidly and, in the end, if the reflection angle θ is equal to the second tilt reference angle $\theta_{TB}$, the intensity of the first holographic diffracted beam $H_A{}^*$ becomes zero. On the other hand, if the reflection angle θ of the reflected beam R* generated by the digital storage medium 14 is equal to the second tilt reference angle $\theta_{TB}$, the second holographic diffracted beam $H_B{}^*$ has a maximum intensity. Further, as the reflection angle θ becomes greater or smaller than the second tilt reference angle $\theta_{TB}$, the intensity of the second holographic diffracted beam $H_B{}^*$ decreases rapidly and, in the end, if the reflection angle θ is equal to the first tilt reference angle $\theta_{TA}$, the intensity of the second holographic diffracted beam $H_B{}^*$ becomes zero. Therefore, if the reflection angle θ of the reflected beam R* ranges from the first tilt reference angle $\theta_{TA}$ to the second tilt reference angle $\theta_{TB}$, both the first and the second holographic diffracted beam $H_A{}^*$, $H_B{}^*$ are detected. In accordance with the present invention, if the intensity of the first holographic diffracted beam $H_A{}^*$ is equal to that of the second holographic diffracted beam $H_B{}^*$, it is determined that the digital storage medium 14 is in a normal state and, if not, an intensity difference between the first and the second holographic diffracted beam $H_A{}^*$, $H_B{}^*$ can be used as a tilt servo signal.

Referring back to FIG. 1, the first and the second detector 18, 20 detect the first and second holographic diffracted beam $H_A{}^*$, $H_B{}^*$ generated in the holographic plate 16 to generate a first and a second detected signal, respectively. The first and second detected signal indicate two intensities of the first and the second holographic diffracted beam $H_A{}^*$, $H_B{}^*$, respectively. The tilt servo signal generator 22 generates the tilt servo signal by finding a difference between the first and the second detected signal. The tilt servo signal is used to adjust the mirror 12 so that an incidence angle of the reconstructing beam may be adjusted and, therefore, a tilt error of the digital storage medium 14 may be compensated. Only the mirror 12 is adjusted by using the tilt servo signal as described in the present embodiment, but it is not limited thereto. For example, a rotational axis 24 of the digital storage medium 14 may be adjusted by using the tilt servo signal to compensate the tilt error of the digital storage medium 14 directly. Further, when the digital storage medium 14 is determined as the holographic storage medium, a pick-up position of the reconstructed signal beam S formed by the diffraction of the reconstructing beam by the holographic interference pattern stored in the holographic storage medium may be compensated based on the tilt error of the holographic storage medium 14. On the other hand, when the digital storage medium 14 is determined as the optical storage medium, a pick-up position of the reflected beam R* may be compensated.

As described above, the reflected beam of the reconstructing beam used in the ROM system and the angular selectivity of the hologram are employed to detect and compensate the tilt error due to the wobbling of the digital storage medium in the ROM system and it is possible to reconstruct more reliable data.

While the invention has been shown and described with respect to the preferred embodiments, it will be understood by those skilled in the art that various changes and modifications may be without departing from the spirit and scope of the invention as defined in the following claims.

What is claimed is:

1. A tilt servo apparatus, comprising:
means for generating a reconstructing beam and projecting the reconstructing beam onto a digital storage medium to generate a reflected beam reflected by the digital storage medium tilted within a tilt range;
a holographic plate for storing a first and a second hologram, wherein the first hologram is an interference pattern between a first tilt reference beam projected at a first tilt reference angle and a first tilt signal beam projected at a first tilt signal angle and the second hologram is an interference pattern between a second tilt reference beam projected at a second tilt reference angle and a second tilt signal beam projected at a second tilt signal angle, and diffracting the reflected beam with the first and the second hologram to generate a first and a second holographic diffracted beam, respectively;
a first and a second detector for generating a first and a second detected signal by detecting the first and the second holographic diffracted beam, respectively;
means for generating a tilt servo signal based on the first and the second detected signal; and
means for compensating a tilt error of the digital storage medium by using the tilt servo signal.

2. The tilt servo apparatus of claim 1, wherein the first and the second tilt reference angle are determined based on a range of a reflection angle of the reflected beam formed by a reflection of the reconstructing beam from the digital storage medium tilted within a specified range.

3. The tilt servo apparatus of claim 2, wherein the first and the second tilt reference angle are determined based on an angular selectivity of the first and the second hologram stored in the holographic plate, respectively.

4. The tilt servo apparatus of claim 1, wherein an incidence angle of the reconstructing beam on the digital storage medium is compensated by using the tilt servo signal.

5. The tilt servo apparatus of claim 1, wherein the reconstructing beam, the reflected beam, the first and the second tilt reference beam, and the first and the second tilt signal beam have an identical wavelength with one another.

6. The tilt servo apparatus of claim 1, wherein the tilt servo signal is a difference between the first and the second detected signal.

7. The tilt servo apparatus of claim 1, wherein the digital storage medium is a holographic storage medium.

8. The tilt servo apparatus of claim 7, wherein the holographic storage medium has a reflective layer for reflecting the reconstructing beam to form the reflected beam.

9. The tilt servo apparatus of claim 7, wherein a pick-up position of a reconstructed signal beam formed by a diffraction of the reconstructing beam by the holographic storage medium is compensated by using the tilt servo signal.

10. The tilt servo apparatus of claim 1, wherein the digital storage medium is an optical storage medium for recording and detecting an optical signal by using a reflection characteristic of a beam.

11. The tilt servo apparatus of claim 1, wherein the reconstructing beam is used to reconstruct data stored in the digital storage medium.

12. A holographic plate for use in a tilt servo apparatus in which a reconstructing beam is reflected by a digital storage medium tilted by a tilt error to generate a reflected beam of the reconstructing beam,
wherein the holographic plate stores a first and a second hologram and diffracts the reflected beam with the first and the second hologram to generate a first and a second holographic diffracted beam, respectively, which are used to form a tilt servo signal for compensating the tilt error of the digital storage medium, wherein the first hologram is a holographic interference pattern between a first tilt reference beam projected at a first tilt reference angle and a first tilt signal beam projected at a first tilt signal angle and the second hologram is a holographic interference pattern between a second tilt reference beam projected at a second tilt reference angle and a second tilt signal beam projected at a second tilt signal angle.

13. The holographic plate of claim 12, wherein the first and the second tilt reference angle are determined based on a range of a reflection angle of the reflected beam formed by a reflection of the reconstructing beam from the digital storage medium tilted by the tile error within a tilt range.

14. The holographic plate of claim 13, wherein the first and the second tilt reference angle are determined based on an angular selectivity characteristics of the first and the second hologram.

15. The holographic plate of claim 12, wherein the digital storage medium is a holographic storage medium which has a reflective layer for reflecting the reconstructing beam to form the reflected beam.

16. The holographic plate of claim 12, wherein the reconstructing beam is used to reconstruct data stored in the digital storage medium.

* * * * *